United States Patent
Matsumoto

(10) Patent No.: US 10,328,659 B2
(45) Date of Patent: Jun. 25, 2019

(54) BASE MATERIAL FOR HONEYCOMB, HONEYCOMB STRUCTURE, AND SANDWICH STRUCTURE

(71) Applicant: Mitsubishi Gas Chemical Company, Inc., Tokyo (JP)

(72) Inventor: Nobuhiko Matsumoto, Kanagawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 50 days.

(21) Appl. No.: 15/504,989

(22) PCT Filed: Jul. 29, 2015

(86) PCT No.: PCT/JP2015/071564
§ 371 (c)(1),
(2) Date: Feb. 17, 2017

(87) PCT Pub. No.: WO2016/031479
PCT Pub. Date: Mar. 3, 2016

(65) Prior Publication Data
US 2017/0253005 A1    Sep. 7, 2017

(30) Foreign Application Priority Data
Aug. 29, 2014 (JP) ................................. 2014-175140

(51) Int. Cl.
*B32B 3/12* (2006.01)
*C08L 23/00* (2006.01)
(Continued)

(52) U.S. Cl.
CPC ................ *B32B 3/12* (2013.01); *B32B 27/32* (2013.01); *B32B 27/34* (2013.01); *C08J 3/005* (2013.01);
(Continued)

(58) Field of Classification Search
CPC ............ B82B 3/12; B82B 27/32; B82B 27/34
(Continued)

(56) References Cited

U.S. PATENT DOCUMENTS

2008/0176027 A1    7/2008 Pflug et al.
2008/0286522 A1*   11/2008 Khan ..................... B31D 3/02
                                                    428/116
(Continued)

FOREIGN PATENT DOCUMENTS

CN          101522388 A    9/2009
JP          2008-520456 A  6/2008
(Continued)

OTHER PUBLICATIONS

International Search Report dated Oct. 27, 2015, for PCT/JP2015/071564 and English translation of the same (2 pages).
(Continued)

*Primary Examiner* — Tri V Nguyen
(74) *Attorney, Agent, or Firm* — Fitch, Even, Tabin & Flannery LLP

(57) ABSTRACT

The present invention provides a honeycomb structure that is light in weight, that has high strength and rigidity, and that is also excellent in water resistance and moldability. The honeycomb structure of the present invention comprises a thermoplastic resin composition containing a polyamide (A) and a modified polyolefin (B), wherein:
the polyamide (A) comprises a diamine unit that contains a xylylenediamine unit for 70 mol % or more and a dicarboxylic acid unit that contains an α,ω-linear aliphatic dicarboxylic acid unit with a carbon number of 4-20 for 50 mol % or more;
the modified polyolefin (B) is a polyolefin having a reactive functional group that is selected from an epoxy group and the like; and
(Continued)

the blending ratio of polyamide (A)/modified polyolefin (B) is in a range of 100/15-70 on a mass basis.

9 Claims, 3 Drawing Sheets

(51) Int. Cl.
  *C08L 23/26* (2006.01)
  *C08L 77/06* (2006.01)
  *E04F 13/08* (2006.01)
  *B32B 27/32* (2006.01)
  *B32B 27/34* (2006.01)
  *C08J 3/00* (2006.01)
  *C08L 51/06* (2006.01)
  *E04C 2/36* (2006.01)
(52) U.S. Cl.
  CPC ............... *C08L 23/26* (2013.01); *C08L 51/06* (2013.01); *C08L 77/06* (2013.01); *E04C 2/365* (2013.01); *E04F 13/08* (2013.01)
(58) Field of Classification Search
  USPC ...................................... 428/116, 118, 474.4
  See application file for complete search history.

(56) References Cited

U.S. PATENT DOCUMENTS

| | | |
|---|---|---|
| 2010/0187865 A1 | 7/2010 | Malek et al. |
| 2010/0304164 A1 | 12/2010 | Sato et al. |
| 2011/0143110 A1* | 6/2011 | Tsuchiya ................. B29C 70/08 428/213 |
| 2012/0082861 A1* | 4/2012 | Sato ........................ B32B 27/08 428/476.9 |
| 2013/0219836 A1 | 8/2013 | Sato et al. |

FOREIGN PATENT DOCUMENTS

| | | |
|---|---|---|
| JP | 2010-168040 A | 8/2010 |
| JP | 2013-237242 A | 11/2013 |
| WO | 2013/094763 A1 | 6/2013 |

OTHER PUBLICATIONS

Extended European Search Report dated Feb. 27, 2018 to the European Patent Application No. 15835855.6 (7 pages).

* cited by examiner

US 10,328,659 B2

BASE MATERIAL FOR HONEYCOMB, HONEYCOMB STRUCTURE, AND SANDWICH STRUCTURE

CROSS-REFERENCE TO RELATED APPLICATIONS

This application is a U.S. national phase application filed under 35 U.S.C. § 371 of International Application PCT/JP2015/071564, filed on Jul. 29, 2015, designating the United States, which claims priority from Japanese Application Number 2014-175140, filed Aug. 29, 2014, which are hereby incorporated herein by reference in their entirety.

FIELD OF THE INVENTION

The present invention relates to a base material for honeycomb that is light in weight and that has excellent strength, rigidity, water resistance and moldability, and to a honeycomb structure and a sandwich structure using the same.

BACKGROUND OF THE INVENTION

Since a honeycomb structure is light in weight and excellent in strength, it has been widely used as an interior material, an exterior material or the like for structures used in various industrial fields including vehicles such as automobiles, aircrafts and ships and building construction. In addition, a synthetic resin honeycomb structure has also been employed as an impact absorbing part for automobiles or the like.

For example, Japanese Unexamined Patent Application Publication No. 2013-237242 (Patent literature 1) describes that a honeycomb structure that has both rigidity and impact absorbing property and that has excellent continuous moldability can be achieved by using a thermoplastic resin composition that is obtained by blending an ethylene-unsaturated carboxylic acid ester copolymer such as a glycidyl methacrylate-modified polyethylene copolymer with a polyamide resin such as nylon 6 to produce a honeycomb structure having a specific cell shape.

Since, however, conventional honeycomb structures are inadequate in water resistance, resistance, there has been a problem that the strength and the rigidity of the honeycomb structures are degraded once water intrudes inside them, and thus their use has been limited. In addition, there has been a need for expanding its applications by further enhancing the strength and the elastic modulus.

CITATION LIST

Patent Literature

[Patent Literature 1] Japanese Unexamined Patent Application Publication No. 2013-237242

SUMMARY OF INVENTION

Under such circumstances, a honeycomb structure that is light in weight, that has high strength and rigidity, and that is excellent in water resistance and moldability has been needed.

The present inventors have gone through keen studies in view of the above-described problem, as a result of which found that a thermoplastic resin composition that is obtained by blending a polyamide containing a xylylene-based diamine unit and an $\alpha,\omega$-linear aliphatic dicarboxylic acid unit in predetermined ranges with a polyolefin having a specific reactive functional group at a predetermined blending ratio can be used to obtain a structure that is light in weight, that has sufficiently high strength and rigidity and that is excellent in water resistance, where the thermoplastic resin composition is unlikely to cause unevenness such as cracks and wrinkles upon molding a honeycomb structure and excellent in moldability such that cell members such as adjacent cell sidewalls can easily be welded to each other, thereby accomplishing the present invention.

Specifically, the present invention provides a base material for honeycomb, a honeycomb structure and a sandwich structure described below.

[1] A base material for honeycomb comprising a thermoplastic resin composition containing a polyamide (A) and a modified polyolefin (B), wherein:

the polyamide (A) comprises a diamine unit that contains a xylylenediamine unit for 70 mol % or more and a dicarboxylic acid unit that contains an $\alpha,\omega$-linear aliphatic dicarboxylic acid unit with a carbon number of 4-20 for 50 mol % or more;

the modified polyolefin (B) is a polyolefin having a reactive functional group that is selected from an epoxy group, an acid anhydride group, an amino group, a cyanate group, a carboxyl group and a combination thereof; and the blending ratio of polyamide (A)/modified polyolefin (B) is in a range of 100/15-70 on a mass basis.

[2] The base material for honeycomb according to [1], wherein the xylylenediamine unit of the polyamide (A) is derived from meta-xylylenediamine, para-xylylenediamine or a mixture thereof, and the $\alpha,\omega$-linear aliphatic dicarboxylic acid unit with a carbon number of 4-20 is derived from adipic acid, sebacic acid or a mixture thereof.

[3] The base material for honeycomb according to either one of [1] and [2], wherein the modified polyolefin (B) is maleic-anhydride-modified polyolefin or $\varepsilon$-caprolactam-modified polyolefin.

[4] The base material for honeycomb according to any one of [1] to [3], wherein the crystallization time of the thermoplastic resin composition upon lowering the temperature is in a range of 150-300 seconds, where the crystallization time is defined as time that takes from the beginning to the end of the crystallization peak upon lowering the temperature on a DSC curve that is measured by differential scanning calorimetry (DSC) under a nitrogen atmosphere and under the conditions such that after a pretreatment of increasing the temperature to melting point of polyamide (A)+35° C. at a temperature raising rate of 10° C./min followed by rapid cooling to 0° C., the temperature is increased to melting point of polyamide (A)+35° C. at a temperature raising rate of 10° C./min, maintained at that temperature for 5 minutes, and cooled to 100° C. at a temperature lowering rate of −5° C./min.

[5] The base material for honeycomb according to any one of [1] to [4], wherein the tensile elastic modulus of the thermoplastic resin composition is in a range of 1000-3000 MPa.

[6] A honeycomb structure formed by using the base material for honeycomb according to any one of [1] to [5].

[7] The honeycomb structure according to [6] which is formed of a plurality of cells, wherein:

each of the cells is defined by a hexagonal surface layer that continuously or intermittently joins the cells together at either top or bottom side, and each cell has cell sidewalls that are annularly arranged to adjoin each other, where the hexagonal surface layer and the cell sidewalls are perpendicular to each other; and the honeycomb structure is formed by folding, and without substantially cutting, a honeycomb structure part that has a three-dimensional structure obtained through plastic deformation of the base material for honeycomb and a connection region that becomes the hexagonal surface layer after the folding.

[8] The honeycomb structure according to either one of [6] and [7], wherein at least some of the cell sidewalls are completely or partially joined together.

[9] A sandwich structure obtained by providing flat plates made of the same material as the material making the honeycomb structure on the upper and lower sides of the honeycomb structure according to any one of [6]-[8].

[10] A sandwich structure obtained by providing flat plates made of a material different from the material making the honeycomb structure on the upper and lower sides of the honeycomb structure according to any one of [6]-[8].

As preferable embodiments of the present invention, the honeycomb structure, the sandwich structure and the base material for honeycomb for producing the same are as follows.

[11] A honeycomb structure comprising a thermoplastic resin composition containing a polyamide (A) and a modified polyolefin (B), wherein:

the polyamide (A) comprises a diamine unit that contains a xylylenediamine unit for 70 mol % or more and a dicarboxylic acid unit that contains an $\alpha,\omega$-linear aliphatic dicarboxylic acid unit with a carbon number of 4-20 for 50 mol % or more;

the modified polyolefin (B) is a polyolefin having a reactive functional group that is selected from an epoxy group, an acid anhydride group, an amino group, a cyanate group, a carboxyl group and a combination thereof; and the blending ratio of polyamide (A)/modified polyolefin (B) is in a range of 100/15-70 on a mass basis.

[12] The honeycomb structure according to [11], wherein the xylylenediamine unit of the polyamide (A) is derived from meta-xylylenediamine, para-xylylenediamine or a mixture thereof, and the $\alpha,\omega$-linear aliphatic dicarboxylic acid unit with a carbon number of 4-20 is derived from adipic acid, sebacic acid or a mixture thereof.

[13] The honeycomb structure according to either one of [11] and [12], wherein the modified polyolefin (B) is maleic-anhydride-modified polyolefin or ε-caprolactam-modified polyolefin.

[14] The honeycomb structure according to any one of [11] to [13], wherein the crystallization time of the thermoplastic resin composition upon lowering the temperature is in a range of 150-300 seconds, where the crystallization time is defined as time that takes from the beginning to the end of the crystallization peak upon lowering the temperature on a DSC curve that is measured by differential scanning calorimetry (DSC) under a nitrogen atmosphere and under the conditions such that after a pretreatment of increasing the temperature to melting point of polyamide (A)+35° C. at a temperature raising rate of 10° C./min followed by rapid cooling to 0° C., the temperature is increased to melting point of polyamide (A)+35° C. at a temperature raising rate of 10° C./min, maintained at that temperature for 5 minutes, and cooled to 100° C. at a temperature lowering rate of −5° C./min.

[15] The honeycomb structure according to any one of [11] to [14], wherein the tensile elastic modulus of the thermoplastic resin composition is in a range of 1000-3000 MPa.

[16] The honeycomb structure according to any one of [11] to [15] which is formed of a plurality of cells, wherein:

each of the cells is defined by a hexagonal surface layer that continuously or intermittently joins the cells together at either top or bottom side, and each cell has cell sidewalls that are annularly arranged to adjoin each other, where the hexagonal surface layer and the cell sidewalls are perpendicular to each other; and the honeycomb structure is formed by folding, and without substantially cutting, a honeycomb structure part that has a three-dimensional structure obtained through plastic deformation of the base material for honeycomb and a connection region that becomes the hexagonal surface layer after the folding.

[17] The honeycomb structure according to [16], wherein at least some of the cell sidewalls are completely or partially joined together.

[18] A sandwich structure obtained by providing flat plates made of the same material as the material making the honeycomb structure on the upper and lower sides of the honeycomb structure according to any one of [11]-[17].

[19] A sandwich structure obtained by providing flat plates made of a material different from the material making the honeycomb structure on the upper and lower sides of the honeycomb structure according to any one of [11]-[17].

[20] A base material for honeycomb comprising a thermoplastic resin composition containing a polyamide (A) and a modified polyolefin (B), for producing the honeycomb structure according to any one of [11]-[17] or the sandwich structure according to either one of [8] and [9] wherein:

the polyamide (A) comprises a diamine unit that contains a xylylenediamine unit for 70 mol % or more and a dicarboxylic acid unit that contains an $\alpha,\omega$-linear aliphatic dicarboxylic acid unit with a carbon number of 4-20 for 50 mol % or more;

the modified polyolefin (B) is a polyolefin having a reactive functional group that is selected from an epoxy group, an acid anhydride group, an amino group, a cyanate group, a carboxyl group and a combination thereof; and the blending ratio of polyamide (A)/modified polyolefin (B) is in a range of 100/15-70 on a mass basis.

According to the present invention, a base material for honeycomb that is light in weight, that has high strength and rigidity, and that is excellent in water resistance and moldability, as well as a honeycomb structure that uses the same and a sandwich structure obtained by providing flat plates on upper and lower sides of said honeycomb structure can be obtained.

DESCRIPTION OF EMBODIMENTS

Figure 1:
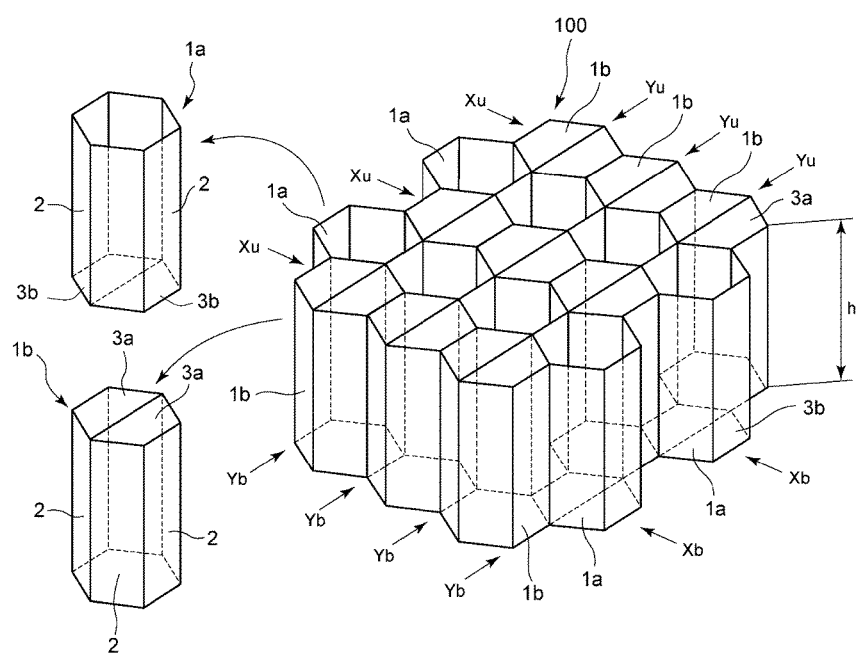
FIG. 1 A schematic perspective view showing a part of a honeycomb structure of one embodiment of the present invention.

Hereinafter, preferable embodiments of a base material for honeycomb, a honeycomb structure and a sandwich structure of the present invention will be described specifically.

1. Base Material for Honeycomb

First, a base material for honeycomb of the present invention will be described.

The base material for honeycomb of the present invention comprises a thermoplastic resin composition that contains a polyamide (A) and a modified polyolefin (B), wherein:

the polyamide (A) comprises a diamine unit that contains a xylylenediamine unit for 70 mol % or more and a dicarboxylic acid unit that contains an α,ω-linear aliphatic dicarboxylic acid unit with a carbon number of 4-20 for 50 mol % or more;

the modified polyolefin (B) is a polyolefin having a reactive functional group that is selected from an epoxy group, an acid anhydride group, an amino group, a cyanate group, a carboxyl group and a combination thereof; and the blending ratio of polyamide (A)/modified polyolefin (B) is in a range of 100/15-70 on a mass basis.

As described above, the present invention uses a thermoplastic resin composition that contains a specific polyamide (A) and a modified polyolefin (B) at a predetermined blending ratio. The above-described thermoplastic resin composition can be used so as to obtain a base material for honeycomb that is light in weight, that has high strength and rigidity, and that is also excellent in water resistance.

(1) Polyamide (A)

The polyamide (A) used with the present invention comprises a diamine unit that contains a xylylenediamine unit represented by General Formula (I) below for 70 mol % or more, as well as a dicarboxylic acid unit that contains an α,ω-linear aliphatic dicarboxylic acid unit with a carbon number of 4-20 represented by General Formula (II) below for 50 mol % or more.

[Chemical Formula 1]

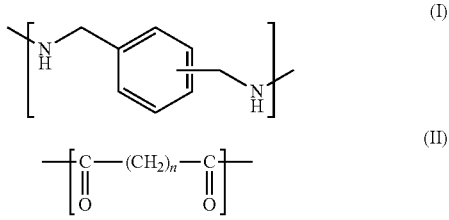

Wherein Formula (II), n is an integer of 2-18.

In this regard, the sum of the diamine unit and the dicarboxylic acid unit should not exceed 100 mol %. In addition, the polyamide (A) may contain a structural unit other than the above-described units within a range that does not impair the effect of the present invention.

The diamine unit of the polyamide (A) contains the xylylenediamine unit represented by General Formula (I) above for 70 mol % or more. The xylylenediamine unit of the diamine unit is preferably 80 mol % or more, more preferably 90 mol % or more, and still more preferably 95 mol % or more.

Examples of a compound that may constitute the xylylene unit include ortho-xylylenediamine, meta-xylylenediamine and para-xylylenediamine. Among them, meta-xylylenediamine, para-xylylenediamine or a mixture thereof is preferably used and meta-xylylenediamine is more preferably used.

Since not only water resistance but also high strength, high elastic modulus and excellent gas barrier property can be realized and good moldability of the thermoplastic resin composition can be achieved, the meta-xylylenediamine unit is contained in the diamine unit for preferably 50 mol % or more, more preferably 70 mol % or more, still more preferably 80 mol % or more, and particularly preferably 90 mol % or more.

In a case where a mixture of meta-xylylenediamine and para-xylylenediamine is to be used as xylylenediamine constituting the xylylenediamine unit of the polyamide (A), the proportion of para-xylylenediamine to the total amount of meta-xylylenediamine and para-xylylenediamine is preferably 90 mol % or less, more preferably 50 mol % or less and still more preferably 35 mol % or less.

As long as the proportion of para-xylylenediamine is 90 mol % or less, moderate heat resistance and crystalline property can be imparted to the polyamide (A), and good moldability of the thermoplastic resin composition can be achieved.

Examples of a compound that may constitute a diamine unit other than the xylylenediamine unit include, but not limited to, aromatic diamines such as para-phenylenediamine, aliphatic diamines such as 2-methyl-1,5-pentanediamine and 1-amino-3-aminomethyl-3,5,5-trimethylcyclohexane, and polyether-based diamines that have an ether bond as represented by Huntsman's Jeffamine and Elastamine (both are trade names). They may be used alone or two or more types of them may be used in combination.

Next, the dicarboxylic acid unit of the polyamide (A) of the present invention contains the α,ω-linear aliphatic dicarboxylic acid unit represented by General Formula (II) above for 50 mol % or more in the dicarboxylic acid unit. From the standpoint of reactivity upon polymerization as well as crystalline property and moldability of the polyamide, the content of the α,ω-linear aliphatic dicarboxylic acid unit in the dicarboxylic acid unit is preferably 70 mol %, more preferably 80 mol % or more, and still more preferably 90 mol % or more.

In General Formula (II), n is an integer of 2-18, preferably 3-16, more preferably 4-12, and still more preferably 4-8.

Examples of a compound constituting the dicarboxylic acid unit represented by General Formula (II) include, but not limited to, succinic acid, glutaric acid, adipic acid, pimelic acid, suberic acid, azelaic acid, sebacic acid, 1,10-decanedicarboxylic acid, 1,11-undecanedicarboxylic acid and 1,12-dodecanedicarboxylic acid. They may be used alone or two or more types of them may be used in combination. Among them, adipic acid, sebacic acid or a mixture thereof is preferably used since they can impart excellent strength/elastic modulus and workability.

Examples of a compound that may constitute a dicarboxylic acid unit other than the dicarboxylic acid unit represented by General Formula (II) include, but not limited to, oxalic acid, malonic acid, fumaric acid, maleic acid, 1,3-benzene diacetate, 1,4-benzene diacetate, terephthalic acid, isophthalic acid and dicarboxylic acids such as 2,6-naphthalene dicarboxylic acid. They may be used alone or two or more types of them may be used in combination.

In terms of water resistance, strength/elastic modulus, workability and thermal properties such as suitable glass-transition temperature and melting point of the polyamide (A), the α,ω-linear aliphatic dicarboxylic acid unit of the polyamide (A) preferably contains the adipic acid unit for 50 mol % or more. Moreover, in terms of imparting moderate water resistance, strength/elastic modulus, workability and molding processability to the polyamide (A), the α,ω-linear aliphatic dicarboxylic acid unit of the polyamide (A) preferably contains sebacic acid unit for 50 mol % or more.

While the number-average molecular weight (Mn) of the polyamide (A) in terms of polystyrene as measured by gel permeation chromatography (hereinafter, simply referred to as "GPC") is not particularly limited, it is preferably 2000 or more, more preferably 3000 or more, and still more preferably 4000 or more. Moreover, it is preferably 40000 or less, more preferably 30000 or less and still more preferably 20000 or less. As long as the number-average molecular weight is within the above-mentioned range, the amount of unreacted substance as polyamide can be small and the behavior can be stable.

Meanwhile, the quantity of a component whose number-average molecular weight is 1000 or less is preferably 5% or less by mass, more preferably 4% by mass, and still more preferably 3% or less by mass. As long as the quantity of a component with a number-average molecular weight of 1000 or less is within the above-mentioned range, moderate fluidity and good air pressure moldability are likely to be obtained.

The polyamide (A) can be produced by polycondensating a diamine component and a dicarboxylic acid component. The polymerization degree can be controlled by adjusting the polycondensation conditions and else. A small amount of monoamine or monocarboxylic acid may be added upon polycondensation as a molecular weight regulator. Furthermore, the polycondensation reaction can be suppressed to achieve a desired polymerization degree by adjusting the ratio (molar ratio) of the diamine component and the carboxylic acid component constituting the polyamide (A) to shift from 1.

Examples of a method for polycondensating the polyamide (A) include, but not limited to, a reactive extrusion method, a pressure salt method, a normal pressure drop method and a pressure drop method. In addition, the reaction temperature is set as low as possible so that yellowing or gelling of the polyamide (A) can be prevented, which is preferable to obtain a polyamide (A) with stable behavior.

The reactive extrusion method is a method in which a polyamide containing a diamine component and a dicarboxylic acid component is melt kneaded and allowed to react in an extruder. Raw materials for the reactive extrusion method may be used in such a manner that the diamine component and the dicarboxylic acid are directly fed, or they may be prepared into a polyamide salt or a polyamide oligomer with a number-average molecular weight of 2000 or less using a polymerization vessel before being fed. Furthermore, in order to prevent deterioration of the polyamide, the reaction is preferably allowed to proceed under a nitrogen atmosphere while removing water with multistage open vents or vacuum vents.

The pressure salt method is a method in which melt polycondensation is performed under pressure using a nylon salt as a raw material. Specifically, an aqueous nylon salt solution containing a diamine component and a dicarboxylic acid component is prepared, which is then concentrated, and allowed to polycondense by increasing the temperature under pressure while removing the condensation water. While the pressure inside the tank is gradually returned to normal pressure, the temperature is increased to and maintained at about melting point of polyamide (A)+10° C. The temperature is maintained while the pressure is gradually reduced to 0.02 MPaG to continue the polycondensation. Once a certain stirring torque is reached, the pressure inside the tank is increased with nitrogen to about 0.3 MPaG to collect a polyamide (A).

The normal pressure drop method is a method in which a dicarboxylic acid component is heated and melted under normal pressure, and polycondensed by continuously dropping a diamine component while removing the condensation water. In this case, polycondensation reaction takes place while increasing the temperature of the reaction system so that the reaction temperature does not fall below the melting point of the generated polyamide compound. The normal pressure drop method has a higher yield per batch as compared to the above-described pressure salt method since it does not use water for dissolving salt. In addition, since it does not require vaporization/condensation of the raw material components, decrease in the reaction rate can be small and thus the process time can be shortened.

The pressure drop method is a method in which, first, a dicarboxylic acid component is fed into a polycondensation vessel and heat melted, and then it is polycondensed by continuously dropping a diamine component while applying pressure inside the tank to preferably about 0.3-0.4 MPaG and removing the condensation water. In this case, polycondensation reaction takes place while increasing the temperature of the reaction system so that the reaction temperature does not fall below the melting point of the generated polyamide compound. Once the set molar ratio is reached, dropping of the diamine component is ended, and the temperature is increased to and maintained at about melting point of polyamide (A)+10° C. while gradually returning the pressure inside the tank to normal pressure. Subsequently, the temperature is maintained while the pressure is gradually reduced to 0.02 MPaG to continue the polycondensation. Once a certain stirring torque is reached, the pressure inside the tank is increased with nitrogen to about 0.3 MPaG to collect a polyamide compound.

A method for adjusting the melt viscosity, that is, number-average molecular weight, of the polyamide (A) may be a method in which termination point of polymerization is judged by the stirring torque like the above-described polymerization, or a method in which a number-average molecular weight of interest is set by adjusting the molar ratio to shift from 1 in advance at the stage of feeding the monomer.

For polycondensation of the polyamide (A), a phosphorus atom-containing compound is preferably added from the standpoint of promoting the amidation reaction.

Examples of the phosphorus atom-containing compound include: phosphinic acid compounds such as dimethylphosphinic acid and phenylmethylphosphinic acid; hypophosphorous acid compounds such as hypophosphorous acid, sodium hypophosphite, potassium hypophosphite, lithium hypophosphite, magnesium hypophosphite, calcium hypophosphite and ethyl hypophosphite; phosphonic acid compounds such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate and potassium ethylphosphonate; phosphonous acid compounds such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite and ethyl phenylphosphonite; and phosphorous acid compounds such as phosphorous acid, sodium hydrogenphosphite, sodium phosphite, lithium phosphite, potassium phosphite, magnesium phosphite, calcium phosphite, triethyl phosphite, triphenyl phosphite and pyrophosphorous acid.

Among them, hypophosphite metal salts such as sodium hypophosphite, potassium hypophosphite and lithium hypophosphite are particularly preferably used since they are highly effective in promoting amidation reaction and have an excellent effect of preventing coloring. In particular, sodium hypophosphite is preferable. The phosphorus atom-containing compound that can be used with the present invention is not limited to these compounds.

The added amount of the phosphorus atom-containing compound is preferably 0.1-1000 ppm, more preferably 1-600 ppm, and still more preferably 5-400 ppm in terms of phosphorus atom concentration in the polyamide (A). When it is 0.1 ppm or higher, the polyamide (A) is less likely to be colored during polymerization and thus transparency can be enhanced. When it is 1000 ppm or lower, the polyamide (A) is less likely to gelate, and mixing of fisheyes in the molded product which is considered to be caused by the phosphorus atom-containing compound can be reduced, giving good appearance to the molded product.

Furthermore, an alkali metal compound is preferably added, in combination with the phosphorus atom-containing compound, to the polycondensation system of the polyamide (A). In order to prevent coloring of the polyamide compound during polycondensation, the phosphorus atom-containing compound needs to be present for a sufficient amount, which, in some cases, may cause gelling of the polyamide compound. Thus, it is preferable to have an alkali metal compound coexist, also for adjusting the amidation reaction rate.

As the alkali metal compound, an alkali metal hydroxide, an alkali metal acetate, an alkali metal carbonate, an alkali metal alkoxide or the like is preferable. Specific examples of the alkali metal compound that can be used with the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide and sodium carbonate, but it can be used without being limited to these compounds. From the standpoints of controlling the polymerization rate and reducing yellowness, the ratio of the phosphorus atom-containing compound and the alkali metal compound is such that (phosphorus atom-containing compound)/(alkali metal compound) is in a range of preferably 1.0/0.05 to 1.0/1.5, more preferably 1.0/0.1 to 1.0/1.2, and still more preferably 1.0/0.2 to 1.0/1.1.

(2) Modified Polyolefin (B)

The modified polyolefin (B) used with the present invention is a polyolefin having a reactive functional group that is selected from an epoxy group, an acid anhydride group, an amino group, a cyanate group, a carboxyl group and a combination thereof. Among them, a polyolefin having a reactive functional group that is selected from an acid anhydride group, an amino group and a combination thereof is preferable, and a polyolefin having an acid anhydride group is particularly preferable.

Examples of the modified polyolefin (B) include a copolymer or a graft polymer of olefin and a monomer for introducing the above-described reactive functional group, an addition polymer of olefin and a polymer for introducing the above-described reactive functional group, an oxidatively decomposed product of polyolefin and a graft polymer of polyolefin grafted with an organic acid.

While a polyolefin that constitutes the backbone of the modified polyolefin (B) is not particularly limited, examples thereof include: ethylene-based hydrocarbon homopolymers with a carbon number of 2 or more, preferably 2-8, such as low-density polyethylene, medium-density polyethylene, high-density polyethylene, linear low-density polyethylene, polypropylene, 1-polybutene and 1-polymethylpentene; α-olefin homopolymer with a carbon number of 3-20; copolymers of ethylene and α-olefin with a carbon number of 3-20 or copolymers of α-olefin with a carbon number of 3-20 (for example, ethylene-propylene copolymer, ethylene-propylene-diene ternary copolymer, ethylene-1-butene copolymer, ethylene-4-methyl-1-pentene copolymer, ethylene-1-hexene copolymer, ethylene-1-octen copolymer, ethylene-1-decene copolymer, propylene-1-butene copolymer, propylene-4-methyl-1-pentene copolymer, propylene-1-hexene copolymer, propylene-1-octen copolymer, propylene-1-decene copolymer, etc.); and copolymers of α-olefin with a carbon number of 3-20 and cyclic olefin (a copolymer with norbornene, etc.). These polyolefins may be used alone or two or more types of them may be used in combination.

Among them, polyethylene, polypropylene, an ethylene-propylene copolymer or an ethylene-1-butene copolymer is preferably used.

Examples of the monomer used for introducing a reactive functional group into polyolefin include a monomer having a polymerizable unsaturated bond and an epoxy group, a monomer having a polymerizable unsaturated bond and an acid anhydride group, a monomer having a polymerizable unsaturated bond and an amino group, a monomer having a polymerizable unsaturated bond and a cyanate group, and a monomer having a polymerizable unsaturated bond and a carboxyl group. Examples of the monomer used for introducing an amino group include lactams with three or more membered rings.

Examples of the monomer having a polymerizable unsaturated bond and an epoxy group include glycidyl acrylate, glycidyl methacrylate, glycidyl itaconate, glycidyl citraconate, glycidyl oleate, glycidyl linoleate, glycidyl linolenate, glycidyl palmitate and glycidyl stearate. Among them, glycidyl acrylate and glycidyl methacrylate are particularly preferable.

Examples of the monomer having a polymerizable unsaturated bond and an acid anhydride group include maleic anhydride, itaconic anhydride, succinic anhydride, glutaric anhydride, adipic anhydride, citraconic anhydride, tetrahydrophthalic anhydride, butenyl succinic anhydride and endo-bicyclo-(2,2,1)-5-heptene-2,3-dicarboxylic anhydride. Among them, maleic anhydride and itaconic anhydride are more preferable, and maleic anhydride is particularly preferable.

Examples of the monomer having a polymerizable unsaturated bond and an amino group include: amino vinyl ethers represented by $CH_2=CH-O-(CH_2)_m-NH_2$ (m=0-10); amines represented by $CH_2=CH-O-CO(CH_2)_m-NH_2$ (m=1-10); and also aminomethyl styrene, vinyl amine, acrylamide, vinyl acetamide and vinyl formamide.

Moreover, examples of the lactam with three or more membered rings include ε-caprolactam, γ-caprolactam and ω-lauryl lactam.

Among them, the monomer used for introducing an amino group is particularly preferably ε-caprolactam or ω-lauryl lactam.

Examples of the monomer having a polymerizable unsaturated bond and a cyanate group include (meth)acryloyloxyalkyl isocyanates whose alkyl group has a carbon number 1-4, such as acryloyloxymethyl isocyanate, methacryloyloxymethyl isocyanate, 2-acryloyloxyethyl isocyanate, 2-methacryloyloxyethyl isocyanate, 3-acryloyloxypropyl isocyanate and 3-methacryloyloxypropyl isocyanate, as well as 3-isopropenyl-α,α-dimethylbenzyl isocyanate. Among them, acryloyloxymethyl isocyanate and methacryloyloxymethyl isocyanate are particularly preferable.

Examples of the monomer having a polymerizable unsaturated bond and a carboxyl group include acrylic acid, methacrylic acid, maleic acid, fumaric acid, itaconic acid, crotonic acid, methylmaleic acid, methylfumaric acid, citraconic acid, glutaconic acid and metal salts of these carboxylic acids, methyl hydrogen maleate, methyl hydrogen itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, endo-bicyclo-(2,2,1)-5-heptene-2,3-dicarboxylic acid, maleimide, N-ethylmaleimide, N-butylmaleimide, N-phenylmaleimide and 5-norbornene-2,3-dicarboxylic acid. Among them, acrylic acid, methacrylic acid and maleic acid are particularly preferable.

These monomers for introducing a reactive functional group into polyolefin may be used alone or two or more types of them may be used in combination.

Among them, maleic-anhydride-modified polyolefin or ε-caprolactam-modified polyolefin (nylon 6-grafted modified polyolefin) can particularly preferably be used as the modified polyolefin (B).

While the method for introducing a reactive functional group into polyolefin is not particularly limited, a method in which olefin as the main component and the monomer for introducing the reactive functional group are copolymerized in advance, a method in which a monomer for introducing a reactive functional group is introduced into an unmodified polyolefin through a grafting treatment using a radical initiator, or other method can be employed.

Preferably, the introduced amount of the monomer for introducing a reactive functional group is, in total, in a range of preferably 0.1-20% by mass and more preferably 1-10% by mass, to the total mass of the modified polyolefin (B).

The melt flow rate (MFR) of the modified polyolefin (B) used with the present invention (ASTM D 1238, 190° C., 2.16 kg load) is preferably 0.1-20 g/10 min, more preferably 0.3-17 g/10 min, and still more preferably 0.5-15 g/10 min. MFR of 0.1 g/10 min or more can result in good fluidity. Moreover, MFR of 20 g/10 min or less can result in sufficiently high impact strength.

Since the polyamide (A) is a relatively hard material, crack may occur during molding or welding by heating may be impossible with the polyamide (A) alone. Therefore, in a base material for honeycomb of the present invention, the modified polyolefin (B) is blended into the polyamide (A) at a predetermined blending ratio to achieve good honeycomb moldability.

In this regard, the density of the modified polyethylene (B) used with the present invention is preferably 0.8-1 g/cm$^3$, more preferably 0.85-1 g/cm$^3$, and still more preferably 0.85-0.95 g/cm$^3$.

If the density of the modified polyolefin (B) is 0.8 g/cm$^3$ or more, the base material for honeycomb of the present invention can have good heat welding property. If the density of the modified polyolefin (B) is 1 g/cm$^3$ or less, the molded body will have good impact resistance and a honeycomb structure using the base material for honeycomb of the present invention will have excellent rigidity. Here, the density of the modified polyolefin (B) can be measured by the water immersion method described in ISO 1183.

The base material for honeycomb of the present invention can be obtained by molding the above-described thermoplastic resin composition that contains the polyamide (A) and the modified polyolefin (B) at a predetermined blending ratio into a film or a sheet.

The blending ratio of polyamide (A)/modified polyolefin (B) is in a range of 100/15-70, preferably 100/17-70, more preferably 100/20-70 and still more preferably 100/25-30, on a mass basis. By using the polyamide (A) and the modified polyolefin (B) at the above-mentioned blending ratio, a base material for honeycomb that has high strength and rigidity as well as excellent water resistance and moldability can be obtained.

The thermoplastic resin composition used with the present invention may be added with various types of generally used additives within a range that does not inhibit the purpose and the working effect of the present invention. Examples of the additive include, but not limited to, an inorganic filler, a flame retardant, a conductivity imparting agent, a crystal nucleating agent, an ultraviolet absorber, an antioxidant, a damping material, an antibacterial agent, an insecticide, a deodorizer, a coloring-preventing agent, a heat stabilizer, a mold release agent, an antistatic agent, a plasticizer, a lubricant, a colorant, a pigment, a dye, a foaming agent, an antifoamer and a coupling agent.

In the thermoplastic resin composition, the blended amount of the polyamide (A) and the modified polyolefin (B) are preferably 70% or more by mass, more preferably 80% or more by mass and still more preferably 90% or more by mass, in total. As long as the amount is within this range, moldability will not be impaired by any component other than the polyamide (A) and the modified polyamide (B). In the thermoplastic resin composition, the polyamide (A) may react with the modified polyolefin (B) and the additives.

According to the present invention, the crystallization time of the thermoplastic resin composition containing the polyamide (A) and the modified polyolefin (B) upon lowering the temperature is preferably 150-300 seconds, more preferably 150-295 seconds, still more preferably 150-290 seconds, and particularly preferably 160-285 seconds. Herein, "crystallization time of the thermoplastic resin composition upon lowering the temperature" is defined as time that takes from the beginning to the end of the crystallization peak upon lowering the temperature on a DSC curve that is measured by differential scanning calorimetry (DSC) under a nitrogen atmosphere and under the conditions such that after a pretreatment of increasing the temperature to melting point of polyamide (A)+35° C. at a temperature raising rate of 10° C./min followed by rapid cooling to 0° C., the temperature is increased to melting point of polyamide (A)+35° C. at a temperature raising rate of 10° C./min, maintained at that temperature for 5 minutes, and cooled to 100° C. at a temperature lowering rate of −5° C./min. Here, "rapid cooling" in the pretreatment for the measurement means to cool a sample at a temperature gradient, i.e., a temperature lowering rate, of −100° C. or lower/sec. For example, the above-described temperature gradient can be achieved by bringing the sample contained in a sample pan into contact with dry ice.

As long as the crystallization time upon lowering the temperature lies within the above-mentioned range, the base material for honeycomb can easily be cured after molding, and a honeycomb structure can easily be molded since adjacent honeycomb cells can be welded without buckling.

According to a preferable embodiment of the present invention, the tensile elastic modulus of a thermoplastic resin composition containing a polyamide (A) and a modified polyolefin (B) is in a range of preferably 1000-3000 MPa, more preferably 1000-2500 MPa, still more preferably 1500-2500 MPa, and particularly preferably 1500-2100 MPa. As long as the tensile elastic modulus of the thermoplastic resin composition is within the above-mentioned range, the base material for honeycomb can have good moldability. In addition, since the base material for honeycomb of the present invention has moderate rigidity, a honeycomb structure or a sandwich structure obtained therefrom can favorably be used as an impact absorbing material.

In addition, according to a preferable embodiment of the present invention, the tensile strength of the thermoplastic resin composition is in a range of preferably 20-100 MPa, more preferably 30-90 MPa, still more preferably 30-80 MPa, and particularly preferably 30-70 MPa. As long as the tensile strength of the thermoplastic resin composition lies within the above-mentioned range, the strength of a honeycomb structure or a sandwich structure obtained from said base material for honeycomb would be sufficiently high.

Furthermore, the tensile elongation at break of the thermoplastic resin composition is in a range of preferably 10-600%, more preferably 10-550%, still more preferably 15-550%, and particularly preferably 20-520%. As long as the tensile elongation at break of the thermoplastic resin composition lies within the above-mentioned range, the toughness of a honeycomb structure or a sandwich structure obtained from said base material for honeycomb would be sufficiently high.

Herein, values of the tensile elastic modulus, the tensile strength and the tensile elongation at break of a thermoplastic resin composition are determined through measurements according to JIS K7161: 1994 and JIS K7127: 1999, respectively. The details of the measurement methods will be described in the examples.

The method for producing a thermoplastic resin composition is not particularly limited. For example, a thermoplastic resin composition can be produced by subjecting a polyamide (A), a modified polyolefin (B) and any other component to extrusion kneading. A kneader used for extrusion kneading may be, for example, an extruder such as a single-screw extruder or a twin-screw extruder, or a known kneader such as a pressure kneader.

The resulting thermoplastic resin composition can be molded into a film or a sheet to obtain a base material for honeycomb of the present invention. A method for producing a film or a sheet is not particularly limited. A known method, for example, a solution casting method, a melt extrusion method, a calender method or a compression molding method can be employed. Among them, a solution casting method or a melt extrusion method is preferable. In this case, a thermoplastic resin composition that has already been extrusion kneaded can be used, or a polyamide (A), a modified polyolefin (B) and any other component can separately be dissolved in a solvent to give a uniform mixed solution, which is then subjected to the step of molding a film or a sheet through the solution casting method or the melt extrusion method.

Examples of the solvent used for the solution casting method include chlorine-based solvents such as chloroform and dichloromethane; aromatic solvents such as toluene, xylene, benzene and mixed solvents thereof; alcohol-based solvents such as methanol, ethanol, isopropanol, n-butanol and 2-butanol; as well as methylcellosolve, ethylcellosolve, butylcellosolve, dimethylformamide, dimethyl sulfoxide, dioxane, cyclohexanone, tetrahydrofuran, acetone, methyl ethyl ketone (MEK), ethyl acetate and diethylether. These solvents may be used alone or two or more types of them may be used in combination. Examples of the device used for performing the solution casting method include a drum casting machine, a band casting machine and a spin coater.

Examples of the melt extrusion method include a T-die method and an inflation method. The molding temperature of the film upon melt extrusion is preferably 150° C. to 350° C., and more preferably 200° C. to 300° C. When a T-die method is employed to mold a film, a T-die is attached to a tip of a known single- or twin-screw extruder so as to wind up the extruded film to obtain a roll of film. In this case, the temperature of the winding-up roller can suitably be adjusted to stretch the film in the extruding direction, thereby performing an uniaxial stretching step. Alternatively, a step of stretching the film in a direction vertical to the extruding direction can be added so as to perform a sequential biaxial stretching or a simultaneous biaxial stretching step. Here, the base material for honeycomb of the present invention may be an unstretched film or a stretched film. In a case of a stretched film, it may be an uniaxially stretched film or a biaxially stretched film. In a case of a biaxially stretched film, it may be biaxially stretched either simultaneously or sequentially. If the film is biaxially stretched, the mechanical strength as well as the film performance can be enhanced.

The thickness of the film is preferably 0.05-2 mm, more preferably 0.1-1 mm, still more preferably 0.1-0.5 mm, and particularly preferably 0.1-0.3 mm. The thickness of the film may appropriately be determined according to the usage or the like of the base material for honeycomb.

Since the base material for honeycomb of the present invention is made of a thermoplastic resin composition that can be plastically deformed and heat welded, it can be molded into a desired shape by a simple method.

2. Honeycomb Structure

A honeycomb structure of the present invention is not particularly limited as long as it is a honeycomb structure that is formed using the above-described base material for honeycomb. According to a preferable embodiment of the present invention, the honeycomb structure of the present invention comprises a thermoplastic resin composition containing a polyamide (A) and a modified polyolefin (B), wherein:

the polyamide (A) comprises a diamine unit that contains a xylylenediamine unit for 70 mol % or more and a dicarboxylic acid unit that contains an α,ω-linear aliphatic dicarboxylic acid unit with a carbon number of 4-20 for 50 mol % or more;

the modified polyolefin (B) is a polyolefin having a reactive functional group that is selected from an epoxy group, an acid anhydride group, an amino group, a cyanate group, a carboxyl group and a combination thereof; and the blending ratio of polyamide (A)/modified polyolefin (B) is in a range of 100/15-70 on a mass basis. From the standpoint of ensuring higher strength, the honeycomb structure of the present invention is preferably made of a plurality of hexagonal columnar cells arranged in a row.

According to one embodiment of the present invention, each of the cells constituting the honeycomb structure is preferably defined by a hexagonal surface layer that continuously or intermittently joins the cells together at either top or bottom side, and each cell has cell sidewalls that are annularly arranged to adjoin each other, where the hexagonal surface layer and the cell sidewalls are perpendicular to each other. A honeycomb structure having the above-described structure has high strength and also is excellent in continuous moldability.

FIG. 1 is a schematic perspective view showing a part of a honeycomb structure as a one preferable embodiment of the present invention. In FIG. 1, a honeycomb structure 100 comprises a plurality of cells 1a and 1b, where the cells 1a and 1b each consist of cell sidewalls 2 and a surface layer. The surface layer consists of either a top member 3a or a bottom member 3b. Among the cells constituting the honeycomb structure 100, the cell 1a is composed of cell sidewalls 2 and a bottom member 3b whereas the cell 1b is composed of cell sidewalls 2 and a top member 3a. In FIG. 1, the cells 1a and 1b are shown independently.

According to one preferable embodiment of the present invention, the honeycomb structure 100 is formed by linearly arranging a plurality of hexagonal columnar cells (cells 1a and 1b). Each of the cells has a hexagonal surface layer, that is, the top member 3a or the bottom member 3b on either top or bottom side thereof while the other side is open. Furthermore, it has cell sidewalls 2 that annually adjoin each other, each of which having one of the six sides of the surface layer as one of its own sides, where the surface layer and the cell sidewalls 2 are vertical to each other. Each of the cell sidewalls 2 is made of a flat rectangular plate, and each of the longer sides of the six cell sidewalls 2 adjoins to the longer side of the adjacent cell sidewall 2 to form a hexagonal column, as a result of which a hexagonal edges are formed by the shorter sides of the six cell sidewalls 2. Either the upper edge or the lower edge of this hexagonal column is enclosed with the hexagonal surface layer (the top member 3a or the bottom member 3b). Moreover, the other side of the top member 3a or the bottom member 3b is open.

The cells 1b having the top members 3a are linearly arranged in the direction indicated by arrows Xu shown in the figure, where the top members 3a continuously join each other on the upper side. Meanwhile, the cells 1a having the bottom members 3b are linearly arranged in the direction indicated by arrows Xb shown in the figure, where the bottom members 3b continuously join each other on the bottom side. The honeycomb structure 100 can be constituted by alternately arranging the row of continuously joining cells 1a and the row of continuously joining cells 1b. Specifically, the cells 1b having the top members 3a on the upper side are continuously joined in the direction indicated by arrows Xu, and intermittently joined via the cell sidewalls 2 in the direction indicated by arrows Yu that is perpendicular to the direction indicated by arrows Xu. Meanwhile, the cells 1a having the bottom members 3b on the bottom side are continuously joined in the direction indicated by arrows Xb, and intermittently joined via the cell sidewalls 2 in the direction indicated by arrows Yb that is perpendicular to the direction indicated by arrows Xb.

The above-described honeycomb structure 100 can be formed by folding a honeycomb structure part which is formed by plastically deforming the base material for honeycomb, i.e., a single planar body.

According to a preferable embodiment of the present invention, from the standpoints of strength, lightness, rigidity and continuous productivity, the thickness of the cell sidewalls of the honeycomb structure 100 of the present invention is 0.05-2.0 mm, while the cell size defined by the length of the diagonal line passing the center of the hexagon (including the thickness of the cell sidewalls at both ends of the diagonal line) is preferably 11-100 times longer than the thickness of the above-described cell sidewalls. As long as the thickness of the cell sidewalls and the cell size are within the above-mentioned ranges, the strength of the honeycomb structure can be enhanced. The thickness of the cell sidewall is more preferably 0.1-1 mm, still more preferably 0.1-0.5 mm, and particularly preferably 0.1-0.3 mm. Moreover, the cell size is preferably 11-80 times, still more preferably 20-60 times and particularly preferably 30-50 times longer than the thickness of the cell sidewalls.

According to one preferable embodiment of the present invention, each of the cells constituting the honeycomb structure have a surface layer made of the top member 3a or the bottom member 3b. Since the cells have the surface layers, when the honeycomb structure receives high-speed impact, the cell sidewalls are deformed and ruptured while the surface layer formed from the thermoplastic resin composition stretches and deforms, thereby absorbing the impact. Therefore, it has higher impact absorbing property than a structure without the surface layer. Furthermore, since the surface layer serves as a bonding member between the honeycomb structure and the flat plates in the later-described sandwich structure, it also has an advantage of enhancing the adhesive strength between the honeycomb structure and the flat plates. Similar to the cell sidewalls, the thickness of the surface layer is preferably 0.05 mm-2.0 mm. Thickness that is more preferable is also the same as the cell sidewalls.

The height h (i.e., the length of the longer side of the cell sidewall 2) of the honeycomb structure 100 of the present invention is not particularly limited, and may suitably be determined according to the usage. Usually, it is preferably 0.2-5.0 times longer than the cell size.

A method for producing the honeycomb structure of the present invention is not particularly limited. For example, the following methods may be employed: a method in which a honeycomb structure part is folded, where the honeycomb structure part has a three-dimensional structure obtained through plastic deformation of the base material for honeycomb and a connection region that becomes the surface layer after the folding; a method in which the base material for honeycombs is linearly applied with an adhesive agent to be laminated into a block material, which is then deployed; a method in which the base material for honeycomb is folded in bellows and bonded by applying an adhesive agent to the apexes of the creases. Among them, due to excellent continuous moldability, it is preferable to produce a honeycomb structure by folding a honeycomb structure part that has a three-dimensional structure obtained through plastic deformation of the base material for honeycomb and a connection region that becomes the surface layer after the folding.

Figure 2:
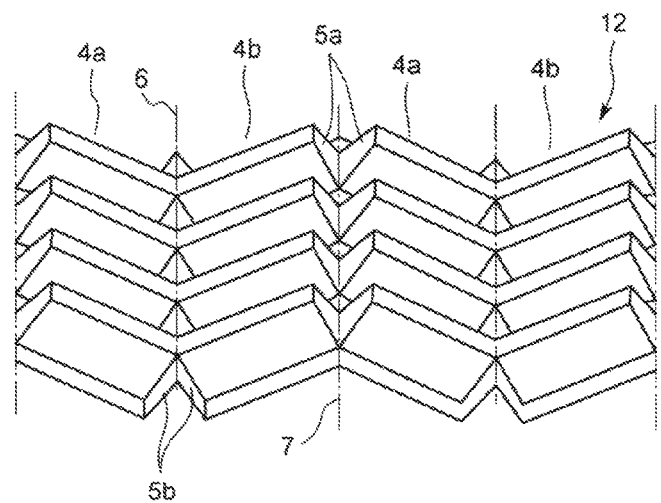
FIG. 2 A schematic perspective view showing one embodiment of a honeycomb structure part that has a three-dimensional structure obtained by plastically deforming a base material for honeycomb of one embodiment of the present invention and a connection region.
Figure 3:
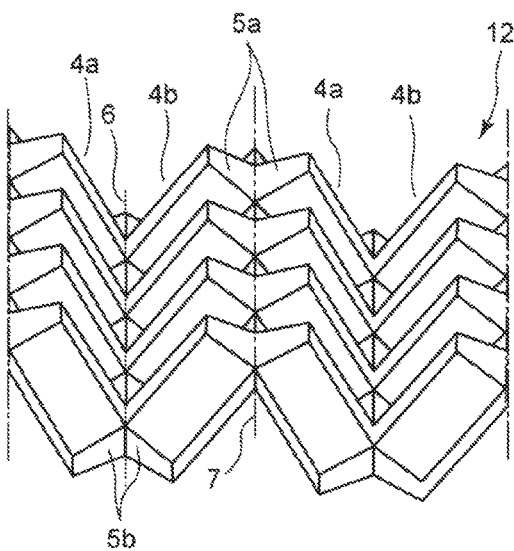
FIG. 3 A schematic perspective view showing a honeycomb structure part of one embodiment of the present invention, in a folded state.

FIG. 2 is a schematic perspective view showing one embodiment of a honeycomb structure part having a three-dimensional structure obtained by plastically deforming a base material for honeycomb of the present invention and a connection region. Furthermore, FIG. 3 is a schematic view showing one embodiment of a folded shape of a honeycomb structure part.

First, a piece of the base material for honeycomb is plastically deformed to mold a honeycomb structure part 12 that has three-dimensional structures 4a and 4b and connection regions 5a and 5b shown in FIG. 2. Next, the honeycomb structure part 12 is folded downward at axes 6, i.e., the border lines between the three-dimensional structures 4a and 4b, such that the three-dimensional structures 4a and 4b face each other and the connection regions 5b make planes, while the honeycomb structure part 12 is folded upward at axes 7, i.e., the border lines between the three-dimensional structures 4b and 4a, such that the connection regions 5a make planes. After the folding, the three-dimensional structures 4a and 4b constitute the cell sidewalls 2 of the cells 1a and 1b shown in FIG. 1, where the downwardly folded connection regions 5a are unfolded to make planes by the upward folding at the axes 7, thereby constituting the top members 3a. Meanwhile, the upwardly folded connection regions 5b are unfolded to make planes by the downward folding at the axes 6, thereby constituting the lower members 3b. In the figure, the axes 6 correspond to the direction indicated by arrows Yb in FIG. 1 while the axes 7 correspond to the direction indicated by arrows Yu.

Preferably, in the row of the cells 1b that are continuously arranged in the direction indicated by arrow Xu in FIG. 1, at least a part of the cell sidewalls 2 is mutually joined with the adjacent cells 1b by using an adhesive agent, through heat welding or the like. Meanwhile, preferably, in the row of the cells 1a that are continuously arranged in the direction indicated by arrow Xb, at least a part of the cell sidewalls 2 is mutually joined with the adjacent cells 1a by using an adhesive agent, through heat welding or the like. In a preferable embodiment of the present invention, at least a part of the mutually facing cell sidewalls 2 of the adjacent cells 1a is preferably completely or partially joined to each other, while at least a part of the mutually facing cell sidewalls 2 of the adjacent cells 1a is preferably completely or partially joined to each other.

The base material for honeycomb can be plastically deformed, for example, through vacuum molding using a rotary-type roller. Rollers that mutually engage and operate facing each other may be used. While heating is required for plastically deforming the base material for honeycomb, the heating method is not particularly limited. For example, a method in which the base material for honeycomb is brought into contact with heated rollers, or a method in which the base material for honeycomb is passed between upper and lower heaters may be employed. Alternatively, the base material for honeycomb can be plastically deformed during the cooling process upon sheet molding with an extruder.

The three-dimensional structures 4a and 4b as well as the connection regions 5a and 5b constituting the honeycomb structure part, that is obtained by plastically deforming the base material for honeycomb, are not formed in a simple manner but they are preferably formed such that the three-dimensional structures 4a and 4b form V-shapes that have the axes 6, i.e., the border lines, as the apexes (for example, the angle between the three-dimensional structures 4a and 4b is 170-190°) while the connection regions 5a and 5b form V-shapes that have the axes 6 and 7 as the apexes (for example, the angle at the connection regions 5a and 5b is 60-90°). By forming the above-described V-shapes upon plastic deformation, folding can efficiently be done in the subsequent folding step.

Figure 4:
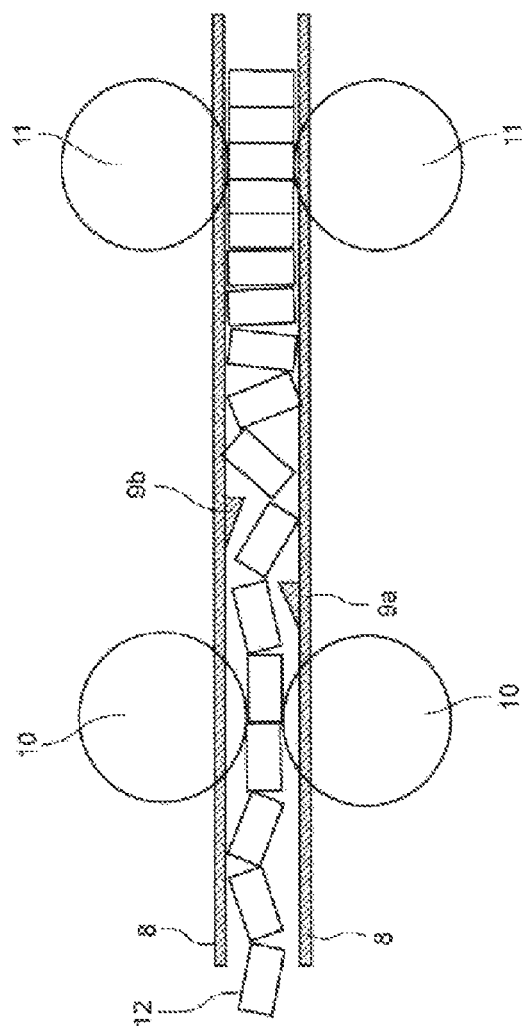
FIG. 4 An illustrative drawing showing one embodiment of a step for folding a honeycomb structure part of one embodiment of the present invention.

Hereinafter, one embodiment of the folding step following the formation of the honeycomb structure part 12 by plastically deforming the base material for honeycomb will be described with reference to FIG. 4. The method for folding the honeycomb structure part of the present invention, however, is not limited thereto. The honeycomb structure part 12 obtained by plastically deforming the base material for honeycomb is sent to the downstream folding step by feed rollers 10 while passing between guiding grids 8. The downward folding at the axes 6 and the upward folding at the axes 7 begin at folding guides 9a and 9b inside the guiding grids provided downstream from the feed rollers 10. Thereafter, the honeycomb structure part 12 is drawn in by the draw-in rollers 11 placed downstream from the folding guides 9a and 9b. The rotation speed of the draw-in rollers 11 is set to be slower than the rotation speed of the feed rollers 10. Due to this difference in the rotation speeds, a completely folded honeycomb structure can be formed continuously.

For details of the method for producing a honeycomb structure, see Japanese Unexamined Patent Application Publication No. 2000-326430, Japanese Unexamined Patent Application Publication (Translation of PCT) No. 2008-520456 and Japanese Unexamined Patent Application Publication No. 2013-237242.

3. Sandwich Structure

Next, a sandwich structure of the present invention will be described. A sandwich structure of the present invention can be made by placing flat plates appropriate for the purpose on the above-described upper and lower sides of the honeycomb structure.

From the standpoint of adhesiveness, strength, rigidity, water resistance and the like, the material of the flat plates is preferably the same as the honeycomb structure of the present invention (specifically, the base material for honeycomb of the present invention). Alternatively, depending on the purpose and the usage of the sandwich structure, the flat plates made of a material that differs from that of the honeycomb structure may be placed on the upper and lower sides of the honeycomb structure. The honeycomb structure can be joined with the flat plates, for example, with an adhesive agent, through heat welding or the like.

Examples of the flat plate material that differs from honeycomb structure include a thermoplastic resin, a thermosetting resin, a metal, wood, fiber and glass.

Examples of the thermoplastic resin used as the flat plate include polyolefin resins such as polyethylene, polypropylene and polybutylene; polyamide resins; polyester resins such as polyethylene terephthalate, polybutylene terephthalate, polycyclohexane dimethyl terephthalate and liquid crystal polyester; styrene-based resins such as a polyoxymethylene resin, a polycarbonate resin, a polyarylate resin, a polymethyl methacrylate resin, polyvinyl chloride, an ABS resin, an AES resin, an AAS resin, a polystyrene (PS) resin and a HIPS resin; a polyphenylene sulfide (PPS) resin, a modified polyphenylene ether (PPE) resin, a polyimide resin, a polyamide imide resin, a polyether imide resin, a polysulfone resin, a polyether sulfone resin, a polyether ketone resin, a polyether ether ketone resin, a phenol resin, a phenoxy resin, or a copolymer, a modified body or a fiber reinforced resin thereof. These may be used alone or two or more types of them may be used in combination.

Examples of the thermosetting resin used as the flat plate include an unsaturated polyester resin, a vinyl ester resin, an epoxy resin, a phenol (resol type) resin, an urea-melamine resin, a polyimide resin, an oxetane resin, a (meth)acrylate resin, a diallyl phthalate resin, a maleimide resin, or a copolymer, a modified body or a fiber reinforced resin thereof. These may be used alone or two or more types of them may be used in combination.

The thermoplastic resin and the thermosetting resin may be added with a filler or other additive within a range that does not impair the properties thereof.

The shape of the filler may be either fibrous or non-fibrous, or a combination of fibrous and non-fibrous fillers may be used. In a case where a filler is used, the blended amount thereof is preferably 30-400 parts by mass in total with respect to 100 parts by mass of the thermoplastic resin or the thermosetting resin.

Examples of the additive include a lubricant, a crystal nucleating agent, a whitening-preventing agent, a matting agent, a heat-resistant stabilizer, a weather-resistant stabilizer, an ultraviolet absorber, a plasticizer, a flame retardant, an antistatic agent, a coloring-preventing agent, an antioxidant and an impact resistance improving agent. Although the blended amount of the additive is not particularly limited as long as it does not impair the purpose and the working effect of the present invention, it is preferably 1-50 parts by mass in total with respect to 100 parts by mass of the thermoplastic resin or the thermosetting resin.

Examples of the metal used as the flat plate include, but not particularly limited to, iron, copper, lead, silver, gold, platinum, titanium, nickel, chromium, magnesium, iron alloys (high-tensile steel, tool steel, cutting steel, Krupp steel, chromium-molybdenum steel, manganum-molybdenum steel, stainless steel, maraging steel, Alloy 42, Invar, Kovar, Sendust, Permendur, silicon steel, KS steel, etc.), copper alloys (brass, red brass, nickel silver, bronze, cupronickel, red copper, constantan, Nordic gold, etc.), aluminum alloys (duralumin, silumin, etc.), nickel alloys (Hastelloy, monel, Inconel, nichrome, Sun platinum metal, permalloy, etc.), and other alloys (magnesium alloys, stellite, solder, pewter, cemented carbide, white gold, amorphous alloys). Among them, iron, copper, aluminum and stainless steel are preferably used.

Examples of wood include, but not particularly limited to, solid wood materials such as zelkova wood and chestnut wood, plywood obtained by stacking veneers, and wooden boards obtained by solidifying crushed wood chips, fiber or the like with a bonding material.

Examples of the fiber include, but not particularly limited to, vegetable fibers such as cotton and linen, animal fibers made from silk, wool or the like, chemical fibers made of nylon, polyester or the like, and inorganic fibers such as glass fiber and carbon fiber. These fibers may be fabricated into fabric or a sheet such as woven fabric, nonwoven fabric or the like, or they may be a prepreg obtained by impregnating the fiber with the thermoplastic resin or the thermosetting resin.

In the sandwich structure of the present invention, the thickness of the flat plate is preferably 0.1-2 mm, more preferably 0.2-1 mm, and still more preferably 0.3-0.5 mm. As long as the thickness of the flat plate is within the above-mentioned range, a honeycomb board having excellent workability and good mechanical properties such that external impact can be dispersed before transmitted to the honeycomb core can be obtained.

The sandwich structure of the present invention can be produced by joining the flat plates onto the upper and lower sides of the honeycomb structure of the present invention. Examples of the joining method include, but not particularly limited to, a method that uses an adhesive agent and a heat welding method.

Since the honeycomb structure and the sandwich structure of the present invention is light in weight and has excellent strength, rigidity and water resistance, it can favorably be used as structural parts for electric and electronic equipments, automated office equipments, home electric appliances and medical instruments, as automobile parts, aircraft parts, ship parts, parts for construction and civil engineering or the like.

Examples of electric and electronic equipments include a display, a FDD carriage, a chassis, HDD, MO, a motor brush holder, a parabolic antenna, a notebook computer, a cell phone, a digital still camera, PDA, a portable MD, a liquid crystal display and a plasma display.

Examples of automated office equipments and home electric appliances include a telephone, a facsimile, VTR, a copying machine, a television, an iron, a hair dryer, a rice cooker, a microwave oven, an acoustic equipment, a vacuum cleaner, toiletry goods, a laser disk, a compact disk, a lighting equipment, a refrigerator, an air conditioner, a typewriter and a word processor.

Examples of automobile parts include an undercover, a scuff plate, a pillar trim, a propeller shaft, a drive shaft, a wheel, a wheel cover, a fender, a side mirror, a room mirror, Fesher, a bumper, a bumper beam, a hood, a trunk hood, an aero part, a platform, a cowl louver, a roof, an instrument panel, a spoiler and various modules.

Examples of aircraft parts include a landing gear pod, a winglet, a spoiler, an edge, a ladder and a fairing.

Examples of ship parts include a deck, upper structure parts and walls.

Examples of parts for construction and civil engineering include a panel, an interior material, an exterior material, a top board, a packaging material and a container.

Among them, the honeycomb structure and the sandwich structure of the present invention are particularly favorably used as structure members for vehicles such as automobiles, aircrafts and ships.

EXAMPLES

Hereinafter, the present invention will be described more specifically by means of examples. The present invention, however, should not be limited to these examples. Herein, various evaluations in the examples and else were carried out according to the following methods.

(1) Tensile Elastic Modulus, Tensile Strength and Tensile Elongation at Break

Evaluations were conducted according to JIS K-7161: 1994 and K-7127: 1999. A film with a thickness of 300 μm fabricated in each of Examples and Comparative examples was cut into 10 mm×100 mm to be used as a test piece. A strograph manufactured by Toyo Seiki Seisaku-sho was used to perform a tensile test under the following conditions to determine the tensile elastic modulus, the tensile strength and the tensile elongation at break: measurement temperature of 23° C., humidity of 50% RH, distance between the chucks of 50 mm and pulling speed of 50 mm/min.

(2) Melting Point Tm (° C.) and Crystallization Time (Second) Upon Lowering the Temperature The glass-transition temperature, the crystallization temperature, the melting point and the crystallization rate were measured by differential scanning calorimetry. The differential scanning calories were measured according to JIS K7121: 1987 and JIS K7122: 1987. The measurement was conducted as follows by using a differential scanning calorimeter (manufactured by Shimadzu Corporation, trade name: "DSC-60").

5 mg of a thermoplastic resin composition was fed into a DSC measurement pan to conduct the measurement after a pretreatment of increasing the temperature to melting point of polyamide (A)+35° C. at a temperature raising rate of 10° C./min under a nitrogen atmosphere followed by rapid cooling to 0° C. at a temperature lowering rate of −100° C./sec by bringing into contact with dry ice. The measurement was conducted under the conditions where the temperature was increased to melting point of polyamide (A)+35° C. at a temperature raising rate of 10° C./min and maintained at that temperature for 5 minutes, and then the temperature was lowered to 100° C. at a temperature lowering rate of −5° C./min, thereby determining the melting point Tm (° C.) of the thermoplastic resin composition.

Furthermore, the crystallization time (second) upon lowering the temperature was determined by measuring the time (second) that takes from the beginning to the end of the crystallization peak upon lowering the temperature on the DSC chart obtained by the above-described measurement.

(3) Water Resistance

A film with a thickness of 100 μm fabricated in each of Examples and Comparative examples was cut into 10 mm×100 mm to be used as a test piece. The test piece was immersed in water, left to stand at 23° C. for a month and then the tensile elastic modulus was measured according to JIS K-7161: 1994 and JIS K-7127: 1999. The resulting elastic modulus retention rate was evaluated based on the following criteria. Here, the elastic modulus retention rate was calculated by Formula: elastic modulus after water immersion/elastic modulus before water immersion×100 (%).

<Evaluation Criteria>
A: Elastic modulus retention rate of 75% or higher
B: Elastic modulus retention rate of 50% or higher but less than 75%
C: Elastic modulus retention rate of less than 50%

(4) Vacuum Moldability

Using an air pressure vacuum molding machine manufactured by Asano Laboratories Co., Ltd., a film with a thickness of 300 μm obtained in each of Examples and Comparative examples was heated with an IR heater until the surface was softened, and then it was subjected to vacuum molding using said molding machine to plastically deform it into a half part of the hexagonal column shown in FIG. 2. The appearance of the resulting deformed film was visually evaluated based on the evaluation criteria below where an object that was plastically deformed as intended with no hole, crack or wrinkle was evaluated as A, an object that was plastically deformed as intended but with a partial unevenness such as a hole, crack or wrinkle was evaluated as B, and an object that was not plastically deformed as intended was evaluated as C.

<Evaluation Criteria>
A: Molded without any problem
B: Molded, but with some unevenness
C: Unable to mold (5) Welding Property A deformed film having a row of the half parts of the hexagonal columns obtained in (4) above was folded as shown in FIGS. 3 and 4 to form a honeycomb structure, which was heated from above and below at 150° C. with a heat press machine to weld the adjacent cell sidewalls and fix the honeycomb structure. Based on the following evaluation criteria, an object that could be folded without any problem and that was sufficiently welded to fix the honeycomb structure after heating was evaluated as A, an object that was welded but that resulted a crack upon folding or resulted unevenness by being plastically deformed slightly upon heating was evaluated as B, and an object that was broken upon folding or that was plastically deformed greatly upon heating was evaluated as C.

<Evaluation Results>
A: Welded without any problem
B: Welded, but with some unevenness
C: Unable to be welded Manufacturing Example 1

Production of Polyamide (A) (MXD6)

15000 g (102.6 mol) of adipic acid, 17.3 g (0.16 mol) of sodium hypophosphite and 12.1 g (0.15 mol) of sodium acetate were fed into an SUS reaction tank with a heating jacket, that had an inner capacity of 50 liters and that was provided with a partial condenser, a total condenser, a pressure gauge, a nitrogen inlet port, a liquid inlet port, a resin-extracting valve and an agitator. The atmosphere inside the reaction tank was replaced with nitrogen. Next, the reaction tank was heated to 170° C. under normal pressure while allowing nitrogen to flow at a rate of 10 ml/min to completely melt adipic acid. Then, 13980 g (102.6 mol) of meta-xylylenediamine was allowed to drop. During meta-xylylenediamine dropping, water generated by polycondensation was removed from the system and the temperature was continuously increased so that the reaction system was not solidified. The whole amount of meta-xylylenediamine was dropped spending 100 minutes and the temperature inside the reaction tank was increased to 250° C. Then, the inner temperature was increased to 260° C. spending 10 minutes while maintaining normal pressure. The temperature was maintained at 260° C. while the pressure inside the reaction tank was reduced to 600 mmHg using an aspirator and a pressure regulator by spending 10 minutes, and polycondensation reaction was continued at 600 mmHg. The torque of the agitator was observed so that once the viscosity of the resin became sufficiently high, agitation was stopped and the pressure inside the reaction tank was increased to 0.2 MPa with nitrogen, before opening the resin-extracting valve at the bottom of the reaction tank. The polymer was extracted in a strand, cooled with water and pelletized with a pelletizer, thereby obtaining about 25 kg of pellets of polyamide (MXD6) containing a meta-xylylene group.

Subsequently, the pellets of the meta-xylylene group-containing polyamide were fed into a jacketed tumble dryer that was provided with a nitrogen gas feed pipe, a vacuum line, a vacuum pump and a thermocouple for measuring the inner temperature, which was rotated at a constant rate while the atmosphere inside the tumble dryer was sufficiently replaced with nitrogen gas with purity of 99% or higher by volume. Thereafter, the tumble dryer was heated under the same nitrogen gas stream to increase the pellet temperature to 150° C. by spending about 150 minutes. Once the pellet temperature reached 150° C., the pressure inside the system was reduced to 1 torr or less. The pellet temperature was further increased to 200° C. by spending about 70 minutes, and maintained at 200° C. for 70 minutes. Then, nitrogen gas with purity of 99% or higher by volume was introduced into the system and the tumble dryer was cooled while keeping it to rotate, thereby obtaining a polyamide (MXD6).

The relative viscosity of the resulting polyamide (MXD6) was 3.5. Moreover, the quantity of a component having a number-average molecular weight of 1000 or lower was 1.1% by mass as measured by GPC. In addition, the melting point (Tm) of the polyamide (MXD6) measured by DSC method was 239° C.

Manufacturing Example 2

Production of Polyamide (A) (MPXD10)

12,135 g (60 mol) of accurately weighed castor-oil plant-derived sebacic acid, 3.105 g of a sodium hypophosphite monohydrate (NaH$_2$PO$_2$/H$_2$O) (50 ppm in terms of phosphorus atom concentration in the polyamide resin) and 1.61 g of sodium acetate were placed into a reaction vessel that was provided with an agitator, a partial condenser, a total condenser, a thermometer, a dropping funnel, a nitrogen feed pipe and a strand die. After an adequate nitrogen replacement, the reaction vessel was filled with nitrogen until an internal pressure of 0.4 MPa was obtained, and heated to 170° C. under a small amount of nitrogen stream while agitating the system. The molar ratio of sodium hypophosphite monohydrate/sodium acetate was 0.67.

To this, 8,335 g (61 mol) of a mixed diamine of meta-xylylenediamine and para-xylylenediamine at 7:3 (molar ratio) was dropped while agitating, and the temperature inside the system was increased continuously while removing the generated condensation water from the system. After dropping the mixed xylylenediamine, melt polymerization reaction was continued at an inner temperature of 260° C. for 20 minutes. Subsequently, the internal pressure was returned to atmospheric pressure at a rate of 0.01 MPa/min.

Thereafter, the pressure inside the system was again increased with nitrogen, and the polymer was taken out from the strand die, which was pelletized to obtain about 24 kg of a polyamide (MPXD10). The resulting pellets were dried with dehumidifying air (dew point: −40° C.) at 80° C. for an hour.

The relative viscosity of the polyamide (MPXD10) was 2.1. Moreover, the quantity of a component having a number-average molecular weight of 1000 or lower was 2% by mass as measured by GPC. In addition, the melting point (Tm) of the polyamide (A) (MPXD10) measured by DSC method was 213° C.

Examples 1-4

The pellets of the polyamide (A) obtained in Manufacturing example 1 or 2 and a commercially available modified polyolefin (B) were mixed at the blending ratio indicated in Table 1, and fed into a T-die single-screw extruder with a cylinder diameter of 30 mm (PTM-30, manufactured by Research Laboratory of Plastics Technology Co., Ltd.). The resultant was melt kneaded under the conditions where a cylinder temperature was 215° C.-280° C. and a number of screw rotations was 30 rpm. Thereafter, film-shaped object was extruded via the T-die and solidified on a cooling roller, thereby obtaining films with thicknesses of 300 μm and 100 μm. The resulting films were used to evaluate the vacuum moldability and the welding property.

Comparative Examples 1-9

Films were molded in the same manner as Examples 1-4 except that the polyamide and the modified polyolefin were used at the blending ratio indicated in Table 2 to evaluate the vacuum moldability and the welding property.

TABLE 1

|  | Example 1 | Example 2 | Example 3 | Example 4 |
|---|---|---|---|---|
| Polyamide (A) | MXD6 | MXD6 | MXD6 | MPXD 10 |
| Modified polyolefin (B) | Amplify GR204 | Apolhya LP21H | Apolhya LP21H | Tafmer MP0610 |
| (A)/(B) blend ratio | 100/25 | 100/25 | 100/66.7 | 100/25 |
| Tensile elastic modulus (MPa) | 1690 | 2080 | 1650 | 1170 |
| Tensile strength (MPa) | 59 | 61 | 48 | 32 |
| Tensile elongation at break (%) | 20 | 31 | 478 | 507 |
| Water resistance | A | A | A | A |
| Melting point (° C.) | 235 | 238 | 237 | 208 |
| Crystallization time upon lowering the temperature (sec) | 168 | 246 | 217 | 285 |
| Vacuum moldability | A | A | A | A |
| Welding property | A | A | A | A |

TABLE 2

|  | Comparative example 1 | Comparative example 2 | Comparative example 3 | Comparative example 4 | Comparative example 5 | Comparative example 6 | Comparative example 7 | Comparative example 8 | Comparative example 9 |
|---|---|---|---|---|---|---|---|---|---|
| Polyamide (A) | MXD6 | MPXD10 | MXD6 | MXD6 | MXD6 | MXD6 | MPXD10 | N6 | N6 |
| Modified polyolefin (B) | — | — | Apolhya LP21H | Novatec UF240 | Tafmer MH5010 | Tafmer MH8510 | Amplify GR204 | — | Bondfast BF-7L |
| (A)/(B) blend ratio | — | — | 100/150 | 100/25 | 100/11 | 100/11 | 100/11 | — | 100/43 |
| Tensile elastic modulus (MPa) | 3450 | 2050 | —* | —* | 2090 | 2040 | 1640 | 880 | 520 |
| Tensile strength (MPa) | 82 | 57 |  |  | 43 | 45 | 47 | 42 | 30 |
| Tensile elongation at break (%) | 3 | 65 |  |  | 70 | 74 | 393 | 311 | 571 |
| Water resistance | A | A |  |  | A | A | A | C | C |
| Melting point (° C.) | 239 | 213 |  |  | 237 | 237 | 210 | 224 | 220 |
| Crystallization time upon lowering the temperature (sec) | 421 | 386 |  |  | 311 | 320 | 328 | 48 | 92 |
| Vacuum moldability | C | B |  |  | A | B | A | B | A |
| Welding property | C | B |  |  | B | B | B | C | A |

*Not evaluated because uniform film was not formed

Modified polyolefins used in Tables 1 and 2 were as follows.

Amplify GR204: manufactured by The DOW Chemical Company, maleic anhydride-modified ethylene-butene copolymer, melt flow rate MFR 12 g/10 min, density 0.95.

Tafmer MH5010: manufactured by Mitsui Chemicals, Inc., maleic anhydride-modified ethylene-butene copolymer, melt flow rate MFR 2.3 g/10 min, density 0.86.

Tafmer MA8510: manufactured by Mitsui Chemicals, Inc., maleic anhydride-modified ethylene-propylene rubber, melt flow rate MFR 2.4 g/10 min, density 0.89.

Apolhya LP21H: manufactured by Arkema, nylon 6-grafted modified polyolefin, melt flow rate MFR 5-15 g/10 min, density 0.99.

Tafmer MP0610: manufactured by Mitsui Chemicals, Inc., maleic anhydride-modified ethylene-propylene copolymer, melt flow rate MFR 0.7 g/10 min, density 0.87.

Novatec UF240: manufactured by Japan Polyethylene Corporation, linear low-density polyethylene (unmodified polyolefin), melt flow rate MFR 2.0 g/10 min, density 0.92.

Bondfast BF-7L: manufactured by Sumitomo Chemical Co., Ltd., glycidyl methacrylate-modified polyethylene copolymer, melt flow rate MFR 7 g/10 min, density 0.96.

N6: manufactured by UBE Industries, Ltd., nylon 6, UBE nylon 1022B.

The base material for honeycomb of the present invention produced with a thermoplastic resin composition containing the polyamide (A) and the modified polyolefin (B) at a predetermined blending ratio indicated in Table 1 has excellent strength, rigidity and water resistance. The base material for honeycomb of the present invention is also excellent in terms of vacuum moldability and welding property. From these results, it was found that the base material for honeycomb of the present invention could be used for continuously molding a honeycomb structure that had excellent strength, rigidity and water resistance.

On the other hand, when a base material for honeycomb was produced only with the polyamide (A) as indicated in Table 2, it had excellent strength, rigidity and water resistance but poor vacuum moldability and welding property, and thus molding workability was inferior (Comparative examples 1 and 2). Furthermore, even when the polyamide (A) was mixed with a modified polyolefin (B), in a case where the blending ratio of the polyamide (A) and the modified polyolefin (B) exceeded the predetermined range, a uniform film could not be produced (Comparative example 3). On the other hand, in a case where the blending ratio of the polyamide (A) and the modified polyolefin (B) fell below the predetermined range, it was found impossible to satisfy both vacuum moldability and welding property (Comparative examples 5, 6 and 7).

Furthermore, in a case where an unmodified polyolefin was used instead of the modified polyolefin (B), a uniform film could not be produced even when the blending ratio of the polyamide (A) and the polyolefin was within the predetermined range (Comparative example 4).

A base material for honeycomb produced using a polyamide resin other than the polyamide (A) alone had low rigidity and poor water resistance and welding property (Comparative example 8). Moreover, a base material for honeycomb made by blending a modified polyolefin (B) to a polyamide resin other than the polyamide (A) had significantly low rigidity and poor water resistance, which would limit the usage of the honeycomb structure and the sandwich structure (Comparative example 9). In Comparative example 9, there was no problem in terms of the vacuum moldability and the welding property even when the crystallization time upon lowering the temperature was less than 100 seconds because nylon 6 was a resin with excellent flexibility and a modified polyethylene was considered to be contained for a sufficient amount.

INDUSTRIAL APPLICABILITY

By using a base material for honeycomb of the present invention, a honeycomb structure and a sandwich structure having excellent strength, rigidity and water resistance can be produced by a simple method. The honeycomb structure and the sandwich structure of the present invention can favorably be used as a structural part for an electric and electronic equipment, an automated office equipment, home electric appliances and a medical instrument, as an automobile part, as an aircraft part, as a ship part and as a part for construction and civil engineering.

The invention claimed is:

1. A honeycomb structure comprising a thermoplastic resin composition containing a polyamide (A) and a modified polyolefin (B), wherein:

the polyamide (A) comprises a diamine unit that contains a xylylenediamine unit for 70 mol % or more and a dicarboxylic acid unit that contains an $\alpha,\omega$-linear aliphatic dicarboxylic acid unit with a carbon number of 4-20 for 50 mol % or more;

the modified polyolefin (B) is a polyolefin having a reactive functional group that is selected from an epoxy group, an acid anhydride group, an amino group, a cyanate group, a carboxyl group and a combination thereof; and a blending ratio of polyamide (A)/modified polyolefin (B) is in a range of 100/15-70 on a mass basis.

2. The honeycomb structure according to claim 1, wherein the xylylenediamine unit of the polyamide (A) is derived from meta-xylylenediamine, para-xylylenediamine or a mixture thereof, and the $\alpha,\omega$-linear aliphatic dicarboxylic acid unit with a carbon number of 4-20 is derived from adipic acid, sebacic acid or a mixture thereof.

3. The honeycomb structure according to claim 1, wherein the modified polyolefin (B) is maleic-anhydride-modified polyolefin or $\varepsilon$-caprolactam-modified polyolefin.

4. The honeycomb structure according to claim 1, wherein a crystallization time of the thermoplastic resin composition upon lowering a temperature is in a range of 150-300 seconds, where the crystallization time is defined as time that takes from the beginning to the end of the crystallization peak upon lowering the temperature on a DSC curve that is measured by differential scanning calorimetry (DSC) under a nitrogen atmosphere and under the conditions such that after a pretreatment of increasing the temperature to melting point of polyamide (A)+35° C. at a temperature raising rate of 10° C./min followed by rapid cooling to 0° C., the temperature is increased to melting point of polyamide (A)+35° C. at a temperature raising rate of 10° C./min, maintained at that temperature for 5 minutes, and cooled to 100° C. at a temperature lowering rate of −5° C./min.

5. The honeycomb structure according to claim 1, wherein a tensile elastic modulus of the thermoplastic resin composition is in a range of 1000-3000 MPa.

6. The honeycomb structure according to claim 1 which is formed of a plurality of cells, wherein:

each of the plurality of cells is defined by a hexagonal surface layer that continuously or intermittently joins the plurality of cells together at either top or bottom side, and each of the plurality of cells has cell sidewalls that are annularly arranged to adjoin each other, where the hexagonal surface layer and the cell sidewalls are perpendicular to each other; and the honeycomb structure is formed by folding, and without cutting, a honeycomb structure part that has a three-dimensional structure obtained through plastic deformation of a base material for honeycomb and a connection region that becomes the hexagonal surface layer after the folding.

7. The honeycomb structure according to claim 6, wherein at least some of the cell sidewalls are completely or partially joined together.

8. A sandwich structure comprising the honeycomb structure according to claim 1 with flat plates made of the thermoplastic resin composition on upper and lower sides of the honeycomb structure.

9. A sandwich structure comprising the honeycomb structure according to claim 1 with flat plates made from a material different from the thermoplastic resin composition on upper and lower sides of the honeycomb structure.

* * * * *